(12) United States Patent
Otani et al.

(10) Patent No.: US 8,208,623 B2
(45) Date of Patent: Jun. 26, 2012

(54) ECHO PROCESSING METHOD AND DEVICE

(75) Inventors: Takeshi Otani, Kawasaki (JP); Masanao Suzuki, Kawasaki (JP); Yasuji Ota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1306 days.

(21) Appl. No.: 11/863,536

(22) Filed: Sep. 28, 2007

(65) Prior Publication Data
US 2008/0118055 A1 May 22, 2008

(30) Foreign Application Priority Data

Nov. 21, 2006 (JP) ................. 2006-314571

(51) Int. Cl.
H04M 9/08 (2006.01)
H04B 3/20 (2006.01)
H04W 74/00 (2009.01)
A61F 11/06 (2006.01)
(52) U.S. Cl. ............... 379/406.12; 379/406.1; 370/292; 455/570; 381/71.11; 381/71.14
(58) Field of Classification Search ... 379/406.02–406.14; 381/66, 71.1–71.14; 370/286–295; 704/200, 231–240
See application file for complete search history.

(56) References Cited

U.S. PATENT DOCUMENTS

| 3,183,313 | A | * | 5/1965 | Cutler ...................... 379/406.07 |
| 4,558,187 | A | * | 12/1985 | Billi et al. ..................... 379/402 |
| 4,628,157 | A | | 12/1986 | Chance et al. |
| 4,969,144 | A | | 11/1990 | Blackwell et al. |
| 6,272,106 | B1 | | 8/2001 | Kawahara et al. |
| 7,068,780 | B1 | | 6/2006 | Levonas et al. |
| 7,747,002 | B1 | * | 6/2010 | Thi et al. .................. 379/406.08 |

(Continued)

FOREIGN PATENT DOCUMENTS

| JP | 62-299120 | 12/1987 |
| JP | 63-236423 | 10/1988 |

(Continued)

OTHER PUBLICATIONS

European Search Report dated May 28, 2008, from the corresponding European Application.

Primary Examiner — Fan Tsang
Assistant Examiner — Jeffrey Lytle
(74) Attorney, Agent, or Firm — Katten Muchin Rosenman LLP

(57) ABSTRACT

In an echo processing method and device which can detect an accurate echo section without effects of a far end signal, an echo delay, and a reduction of an echo cancellation amount, a signal of a specified frequency band is generated in conformity with a near end signal, and the signal of the specified frequency band is added to the near end signal to form a transmitting signal. Receiving signals are separated into the signal of the specified frequency band and a signal of a band other than the specified frequency band. An echo section is detected based on the signal of the specified frequency band separated. An echo component in the signal of the band other than the specified frequency band is removed and a level of the echo component is detected based on the near end signal in the echo section. Each step may be performed with a digital signal, the transmitting signal may be converted into an analog signal to be inputted to a 2-wire/4-wire converter, the receiving signal may be outputted from the 2-wire/4-wire converter to be converted into the digital signal.

20 Claims, 12 Drawing Sheets

U.S. PATENT DOCUMENTS

| | | |
|---|---|---|
| 2003/0118177 A1 | 6/2003 | Karakas et al. |
| 2003/0152152 A1* | 8/2003 | Dunne et al. .................. 375/241 |
| 2005/0068985 A1* | 3/2005 | Li ................................ 370/491 |
| 2006/0018457 A1* | 1/2006 | Unno et al. .............. 379/388.04 |
| 2007/0004286 A1* | 1/2007 | Hobbel ........................ 439/676 |
| 2007/0092074 A1* | 4/2007 | Takada .................... 379/406.08 |

FOREIGN PATENT DOCUMENTS

| | | |
|---|---|---|
| JP | 64-27325 | 1/1989 |
| JP | 3-218150 | 9/1991 |
| JP | 7-303072 | 11/1995 |
| JP | 9-312596 | 12/1997 |
| WO | 2004/042951 | 5/2004 |

* cited by examiner

FIG.5

| | X[n] | N₀[n] | | N[n]= α ·N₀[n] |
|---|---|---|---|---|
| | -100 | 6182 | | 72 |
| | 50 | 531 | | 6 |
| | 200 | -1823 | | -21 |
| | 400 | -3207 | | -37 |
| SIGNAL | 600 | 3541 | → | 41 |
| | 320 | -558 | | -6 |
| | 1 | -1204 | | -14 |
| | -50 | -3395 | | -39 |
| | -240 | -2521 | | -29 |
| | -500 | 650 | | 8 |

Σ (SIGNAL)²    9850010    84710890    $\sqrt{\dfrac{\Sigma X[n]^2}{\Sigma N_0[n]^2}} = \alpha = 0.011628$

ECHO PROCESSING METHOD AND DEVICE

BACKGROUND OF THE INVENTION

1. Field of the Invention

The present invention relates to an echo processing method and device, and in particular to a method and device for processing a line echo which occurs in a converter between a digital line and an analog line in a private branch exchange (PBX), a conference device, and the like.

2. Description of the Related Art

In order to make communications between a digital telephone and an analog telephone, a conversion between a digital 4-wire line and an analog 2-wire line is required.

FIG. 10 shows a 2-wire/4-wire converter used for such a conversion. In the 2-wire/4-wire converter, due to impedance mismatching, a near end signal from a digital line of an extension line, VoIP, or the like on a transmitting side turns around to a receiving side as a line echo LE as shown in FIG. 10. It is known that a near end receiver unintentionally hears a voice of a near end caller with a time delay due to the line echo LE, which leads to interference of the conversation.

As a technology for cancelling such a line echo, an echo canceller has been well known. One example of the echo canceller is mentioned in the patent document 1. As shown in FIG. 11, by performing a convolution to a reference signal (transmitting signal Ts) that is a near end signal As in an adaptive filter 5_1 composed of a digital filter, an estimated echo signal (pseudo echo signal) Ec is generated, so that an echo component is removed by subtracting the estimated echo signal Ec from a receiving signal Rs in a subtractor 5_2. Concurrently, with the output signal of the echo canceller 5 being made an error signal Es, filter coefficients of the adaptive filter 5_1 are adaptively updated so that the error signal Es may become small (learning of propagation characteristic).

If such a learning of propagation characteristic is performed while no error is occurring, an erroneous learning will be performed, resulting in a deterioration of an echo removal performance. Accordingly, an accurate detection of a section where an echo is occurring and a learning control based on the detection result become important.

As an echo detection system for detecting such an echo section, various systems have been proposed, and the typical arrangement thereof is shown in FIG. 12. In this echo detection system, an echo detector 6 is added to the echo canceller 5. The transmitting signal (reference signal) Ts, the receiving signal Rs, and the error signal Es of the echo canceller 5 are acoustically analyzed/compared as shown in the following (1)-(3), so that a detection result Dr of the echo section is outputted, only in which the echo canceller 5 is driven:

(1) Power difference between the transmitting signal Ts and the receiving signal Rs
(2) Echo cancellation amount (power difference between the receiving signal Rs and an output signal Os), or the variation thereof
(3) Cross-correlation value between the transmitting signal Ts and the receiving signal Rs It is to be noted that there has been proposed an initialization type echo canceller which connects a signal source of an appropriate frequency to 4-wire transmitting points upon training, and obtains a gain coefficient and a phase coefficient by monitoring responses at four reception points, thereby enabling an initialization of the echo canceller to converge in a short time (see e.g. patent document 2).

Furthermore, there have been a double-talk detecting method and device which accurately detect presence/absence of double-talk even when a speech transmitting power of a far end speaker is larger than that of a near end speaker (see e.g. patent document 3).

Furthermore, there has been an echo canceller in which a suppression degree of the echo by the echo canceller provided in the 4-wire section of the 2-wire/4-wire converter of the private branch exchange is reduced depending on a length of a line of a 2-wire subscriber line, thereby reducing interference of communication (see e.g. patent document 4).

[Patent Document 1] Japanese Patent Application Laid-open No. 64-27325
[Patent Document 2] Japanese Patent Application Laid-open No. 63-236423
[Patent Document 3] Japanese Patent Application Laid-open No. 7-303072
[Patent Document 4] Japanese Patent Application Laid-open No. 9-312596

In the above-mentioned echo detection methods (1)-(3), there has been a problem that an echo detection accuracy is low due to the following effects:

(i) Effect of Far End Signal

Since the receiving signal includes a far end signal in addition to an echo, echo detection is erroneously made in some cases even if no echo occurs when the echo detection is performed by comparing the transmitting signal with the receiving signal (echo detection methods (1) and (3)).

(ii) Effect of Echo Delay

Since an echo arises due to the transmitting signal leaking into the receiving signal with a time delay, a correction of the time delay is required when the echo detection is performed by comparing the transmitting signal with the receiving signal (echo detection methods (1) and (3)). If the correction is erroneously performed, the echo detection itself may be erroneous.

(iii) Effect of Reduction of Echo Cancellation Amount

When the echo detection is performed based on the echo cancellation amount (or the time variation thereof) (echo detection method (2)), if the echo cancellation amount once decreases, the echo detection accuracy will also decrease, resulting in a vicious circle of inducing further decreases of the echo cancellation amount in some cases.

SUMMARY OF THE INVENTION

It is accordingly an object of the present invention to provide an echo processing method and device which can detect an accurate echo section without effects of a far end signal, an echo delay, and a reduction of an echo cancellation amount.

In order to achieve the above-mentioned object, an echo processing method (or device) according to the present invention comprises: a first step of (or portion) generating a signal of a specified frequency band in conformity with a near end signal, and adding the signal of the specified frequency band to the near end signal to form a transmitting signal; a second step of (or portion) separating receiving signals into the signal of the specified frequency band and a signal of a band other than the specified frequency band; a third step of (or portion) detecting an echo section based on the signal of the specified frequency band separated at the second step (or by the second portion); and a fourth step of (or portion) removing an echo component in the signal of the band other than the specified frequency band and of detecting a level of the echo component, based on the near end signal in the echo section.

FIG. 1 shows a principle of an echo processing method and device according to the present invention. The above-mentioned first step (or portion) corresponds to a signal converter 2, the second step (or portion) corresponds to a separator 3, the third step (or portion) corresponds to an echo section detector 4, and the fourth step (or portion) corresponds to an echo canceller (or echo level measure) 5. It is to be noted that a 2-wire/4-wire converter 1 which will be described later is not indispensable for the present invention as shown by a dotted line.

Firstly in the signal converter 2 executing the first step, as shown in FIG. 2A, a signal Fs restricted to a specified frequency band (e.g. a high frequency band equal to or more than a predetermined frequency) is internally generated in conformity with a near end signal (reference signal) As. The signal Fs is added to the near end signal As to be outputted as a transmitting signal Ts. Accordingly, a spectrum of the transmitting signal Ts appears as shown in FIG. 2A.

The transmitting signal Ts not only leaks into a receiving signal Rs through the 2-wire/4-wire converter 1 as mentioned above but also turns around through a path between e.g. a speaker and a microphone on a far end side in some cases, regardless of the existence of the 2-wire/4-wire converter 1. When the receiving signal Rs including an echo component in such a form is transmitted to the separator 3, the separator 3 separates the receiving signal Rs into the above-mentioned specified frequency band signal Fs and a signal of a band other than the specified frequency band (non-specified frequency band signal) Ns.

The specified frequency band signal Fs is transmitted to the echo section detector 4. As shown in FIG. 2B, the echo section detector 4 detects an echo section Ep based on the specified frequency band signal Fs, and generates a signal indicating the echo section Ep to be transmitted to the echo canceller (or echo level measure) 5.

In the case of the echo canceller 5, an echo component Ec in the non-specified frequency band signal Ns is removed only in the echo section Ep based on the near end signal (reference signal) As, whereby an output signal Os is generated. Also, in the case of the echo level measure 5, a level of the echo component in the non-specified frequency band signal Ns is detected only in the echo section Ep based on the reference signal As, whereby the output signal Os indicating the level is generated.

Thus, when the specified frequency band signal Fs is added to the near end signal As, the specified frequency band signal Fs is received as an echo. In this case, a far end signal Ds is e.g. a telephone band (equal to or less than 4 kHz) shown in FIG. 2B as a predetermined frequency band, so that only the echo component Ec exists in the specified frequency band signal Fs equal to or more than the telephone band. By monitoring the specified frequency band signal Fs, the echo section Ep can be detected with a high accuracy, thereby enabling the removal or the level detection of the echo component to be accurately performed.

Also, the above-mentioned third step (the echo section detector 4) may include a step of (or portion) comparing an amplitude or power of the signal of the specified frequency band with a predetermined threshold, of determining the echo section when the amplitude or power is more than the threshold, and of determining a non-echo section when the amplitude or power is less than the threshold value.

Furthermore, the above-mentioned first step (the signal converter 2) may include a step of (or portion) determining whether or not voice is included in the near end signal, and a step of (or portion) generating, when it is determined that the voice is included in the near end signal, the signal of the specified frequency band and of adding the generated signal to the near end signal to form the transmitting signal.

Furthermore, the above-mentioned first step (the signal converter 2) may include a step of (or portion) calculating power of the near end signal, and a step of (or portion) generating the signal of the specified frequency band based on the power of the near end signal and of adding the generated signal to the near end signal to form the transmitting signal.

Furthermore, the above-mentioned first step (signal converter 2) may include a step of (or portion) acquiring a spectrum of the near end signal, a step of (or portion) converting the spectrum into a spectrum of the specified frequency band, and a step of (or portion) adding the spectrum of the near end signal with the spectrum of the specified frequency band to be converted into the transmitting signal in time domain.

Furthermore, the above-mentioned first step (the signal converter 2) may include a step of (or portion) acquiring a pitch frequency of the near end signal, a step of (or portion) generating in the specified frequency band a spectrum having a pitch in a vicinity of frequencies of an integral multiple of the pitch frequency, and a step of (or portion) acquiring a spectrum of the near end signal, of adding the spectrum of the near end signal to the spectrum generated in the specified frequency band to be converted into the transmitting signal in time domain.

Furthermore, the above-mentioned signal of the specified frequency band may comprise e.g. a sine wave or a narrow-band noise.

Thus, the echo processing method and device according to the present invention enable a line echo section which occurs in some form to be accurately detected, and the removal or the level detection of the echo component to be performed without effects of the far end voice, the echo delay, and the reduction of the echo cancellation amount.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIG. 5 is a diagram showing a calculation example (where the frame length=10 samples) of N[n] in the embodiment [2] shown in FIG. 4;

DESCRIPTION OF THE EMBODIMENTS

Figure 1:
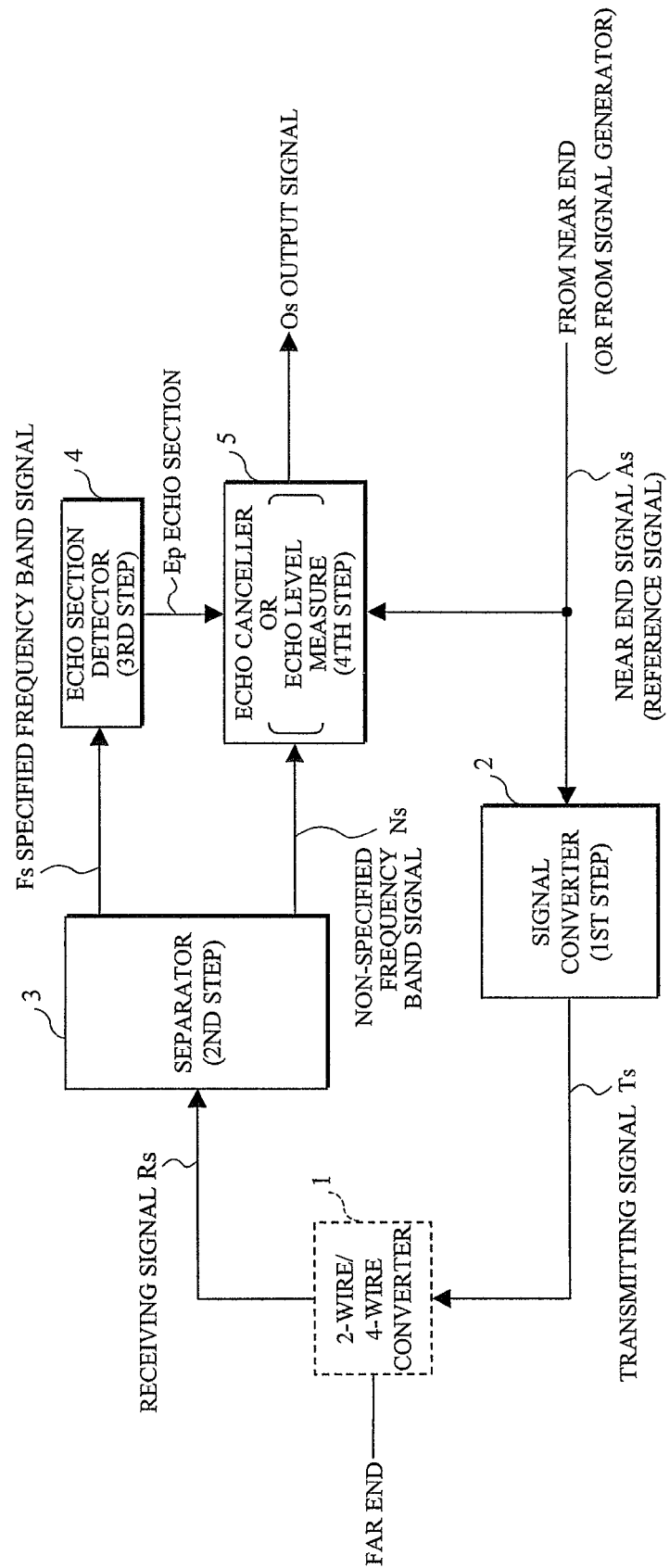
FIG. 1 is a block diagram showing a principle of an arrangement of an echo processing method and device according to the present invention.

Embodiments of the echo processing method and device according to the present invention of which principle is shown in FIG. 1 will now be specifically described referring to the attached figures.

Embodiment [1]

FIG. 3

In this embodiment, the echo processing method and device according to the present invention are applied to an IP private branch exchange, where the IP private branch exchange 10 is arranged between a public network and an IP network. Consequently, the near end signal (reference signal) As is a digital signal obtained after having passed through a decoder 12 from a packet processor 11 connected to the IP network. A signal converter 2 which receives the near end signal As is composed of a voice determining portion 2_1 and a sine wave adder 2_2. The digital transmitting signal Ts outputted from the signal converter 2 is converted into an analog signal by a digital/analog converter (DAC) 13 to be transmitted to the 2-wire/4-wire converter 1.

The 2-wire/4-wire converter 1 is connected to a public network. The far end signal from the public network is converted into the digital receiving signal Rs by an analog/digital converter (ADC) 14. The separator 3 which receives the receiving signal Rs is composed of a lowpass filter (LPF) 3_1 and a highpass filter (HPF) 3_2. The non-specified frequency band signal Ns is outputted from the lowpass filter 3_1, and the specified frequency band signal Fs is outputted from the highpass filter 3_2.

Figure 11:
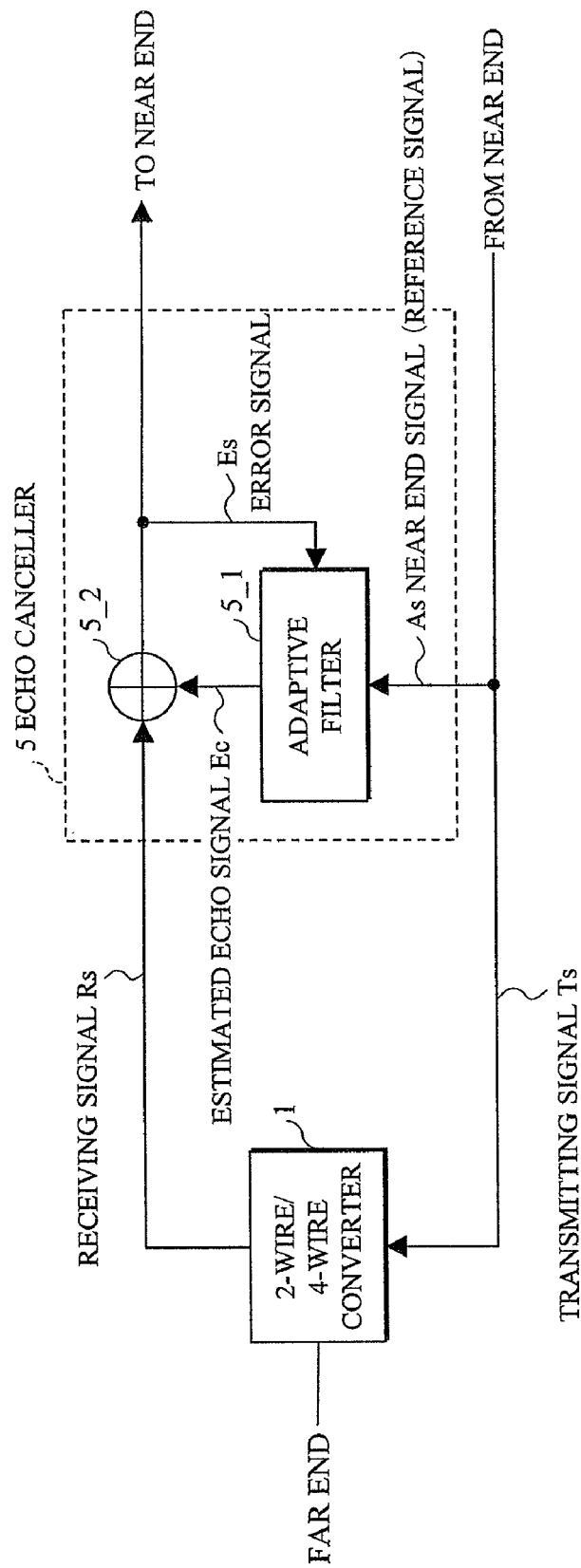
FIG. 11 is a block diagram showing an arrangement of a general echo canceller.
Figure 12:
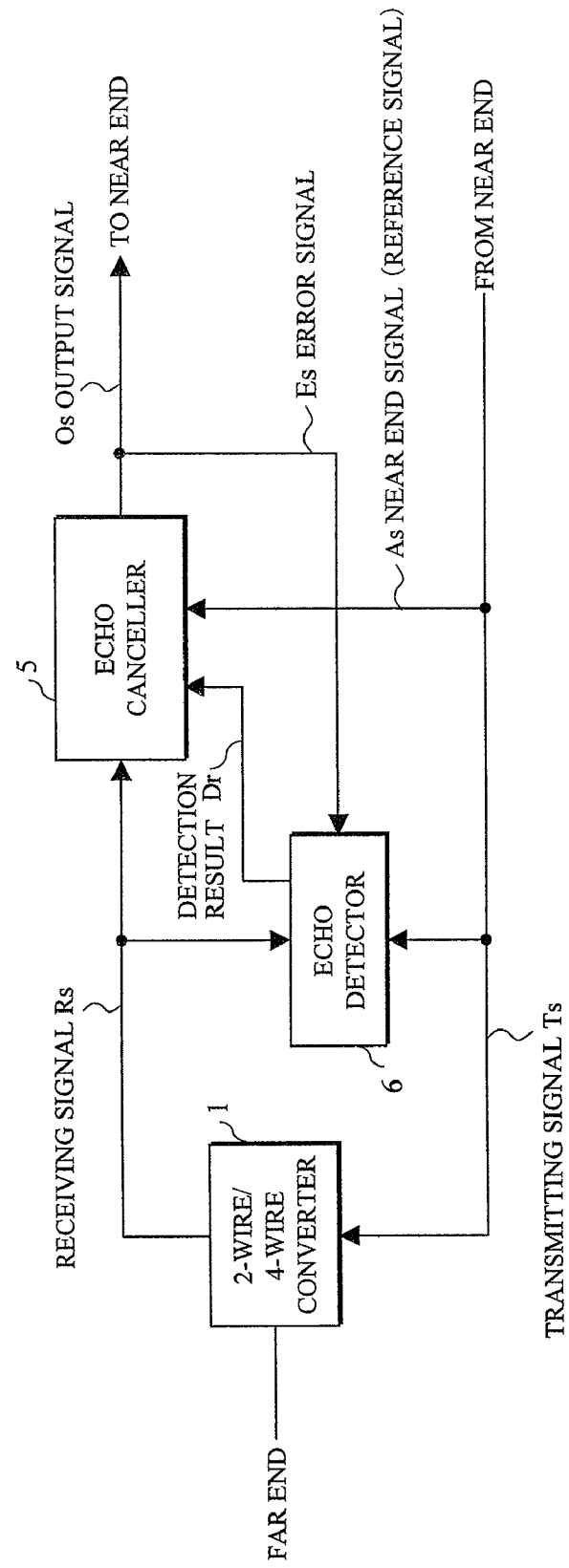
FIG. 12 is a block diagram showing an arrangement of a general echo detection method.

The specified frequency band signal Fs is transmitted to an adaptive filter 5_1 forming the echo canceller 5 as the echo section signal Ep through the echo section detector 4. The non-specified frequency band signal Ns is transmitted to a subtractor 5_2 forming the echo canceller 5 as well. The adaptive filter 5_1 outputs the estimated echo signal Ec as described in the prior art example shown in FIG. 11. In this case, the adaptive filter 5_1 is driven only when the echo section signal Ep is generated (level "1").

The subtractor 5_2 subtracts the estimated echo signal Ec from the non-specified frequency band signal Ns to output the error signal Es. The error signal Es is transmitted from the packet processor 11 to the IP network through an encoder 15.

Figure 3:
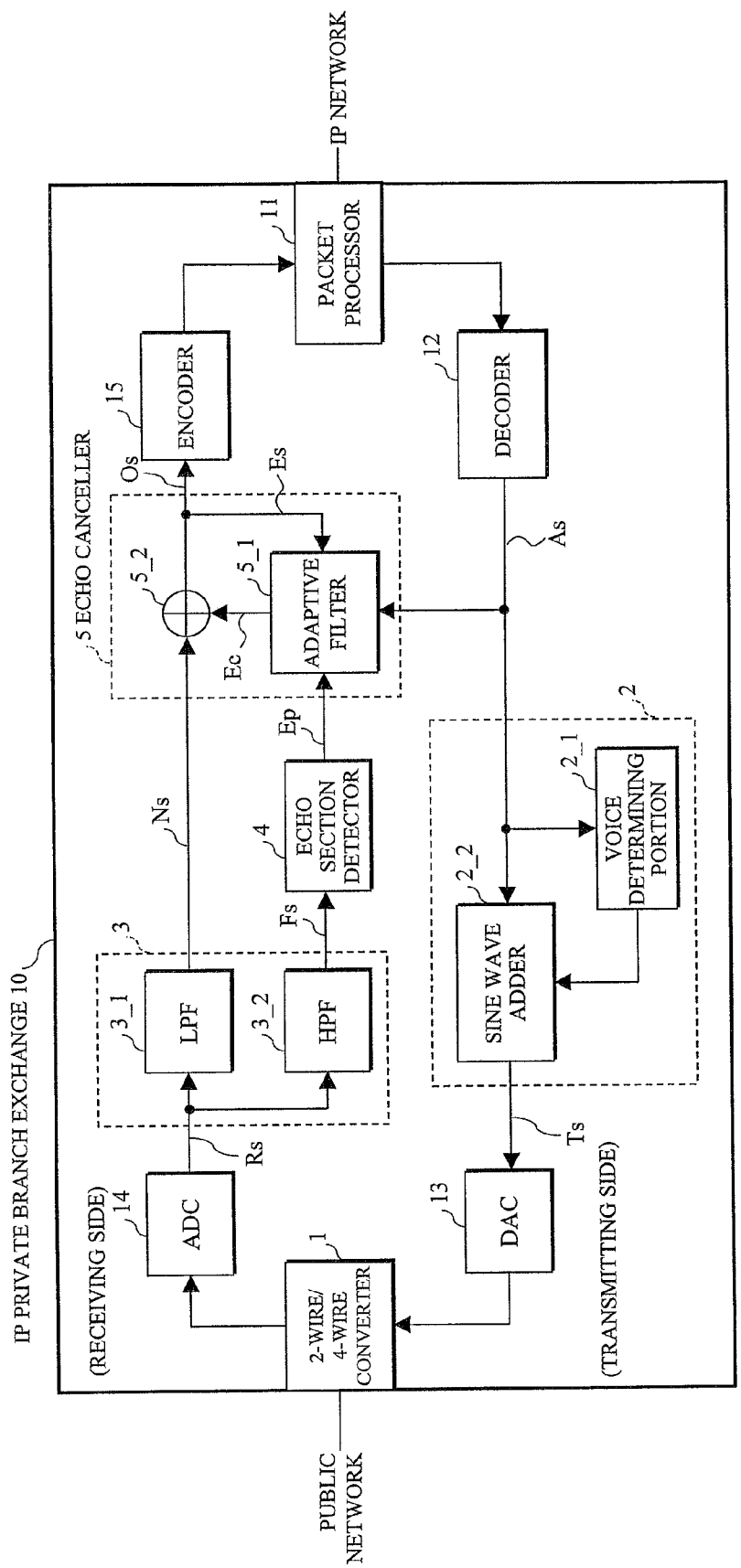
FIG. 3 is a block diagram showing an arrangement of an embodiment [1] of an echo processing method and device according to the present invention.

Thus, the signal converter 2, the separator 3, the echo section detector 4, and the echo canceller 5 shown in FIGS. 1 and 3 operate with a digital signal.

The operation of the embodiment [1] will now be described as divided into the transmitting side and the receiving side.

Figure 2:
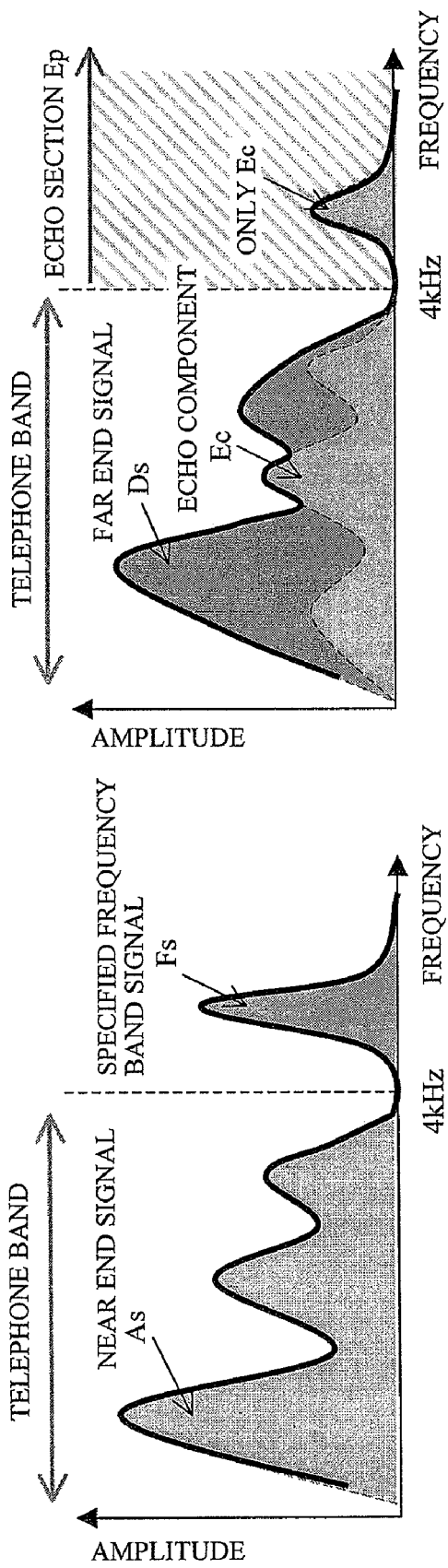
FIGS. 2A and 2B are frequency characteristic diagrams showing an operation principle of the present invention shown in FIG. 1.

Operation on the Transmitting Side:

(1) The packet processor 11 takes received code data out of a packet received from the IP network.
(2) The decoder 12 decodes the received code data to generate the near end signal (reference signal) As.
(3) The voice determining portion 2_1 of the signal converter 2 receives the near end signal As as an input to determine whether or not the near end signal As includes voice.
(4) When the voice determination result of the voice determining portion 2_1 is "voiced", the sine wave adder 2_2 generates a sine wave of 6 kHz (specified frequency band signal Fs shown in FIG. 2A), and adds the near end signal As to the sine wave to form the transmitting signal. When the determination result is "voiceless", the near end signal As is made a transmitting signal as it is.

It is to be noted that the voice determining portion 2_1 generates the sine wave only in the case of "voiced", and the sine wave adder 2_2 may be an adder which simply adds the output signal of the voice determining portion 2_1 to the near end signal As.

(5) The DAC 13 converts the digital transmitting signal Ts into the analog signal to be transmitted to the 2-wire/4-wire converter 1.

Operation on the Receiving Side:

(1) The ADC 14 converts the analog signal received from the public network through the 2-wire/4-wire converter 1 into the digital signal to generate the receiving signal Rs.
(2) The HPF 2_2 and the LPF 2_1 separate the receiving signal Rs into the specified frequency band Fs of 6 kHz which is a highpass signal exceeding 4 kHz, and the non-specified frequency band Ns which is a lowpass signal equal to or less than 4 kHz.
(3) The echo section detector 4 compares the amplitude of the highpass signal Fs with a predetermined threshold, and outputs the determination result as the echo section signal Ep. It is to be noted that when the amplitude is larger than the threshold, the section is determined to be the echo section while when it is less than the threshold, the section is determined to be the non-echo section.
(4) The adaptive filter 5_1 convolves the filter coefficients with the near end signal As being made a reference signal to generate the pseudo echo signal Ec. The subtractor 5_2 subtracts the pseudo echo signal Ec from the lowpass signal Ns to generate the output signal Os. Only when the echo section signal Ep is valid "1", the subtractor 5_2 feeds back the output signal Os as the error signal Es to the adaptive filter 5_1, where the filter coefficients are updated.
(5) The encoder 15 encodes the output signal Os to generate transmitting code data.
(6) The packet processor 11 packetizes the transmitting code data to be transmitted to the IP network.

Embodiment [2]

Figure 4:
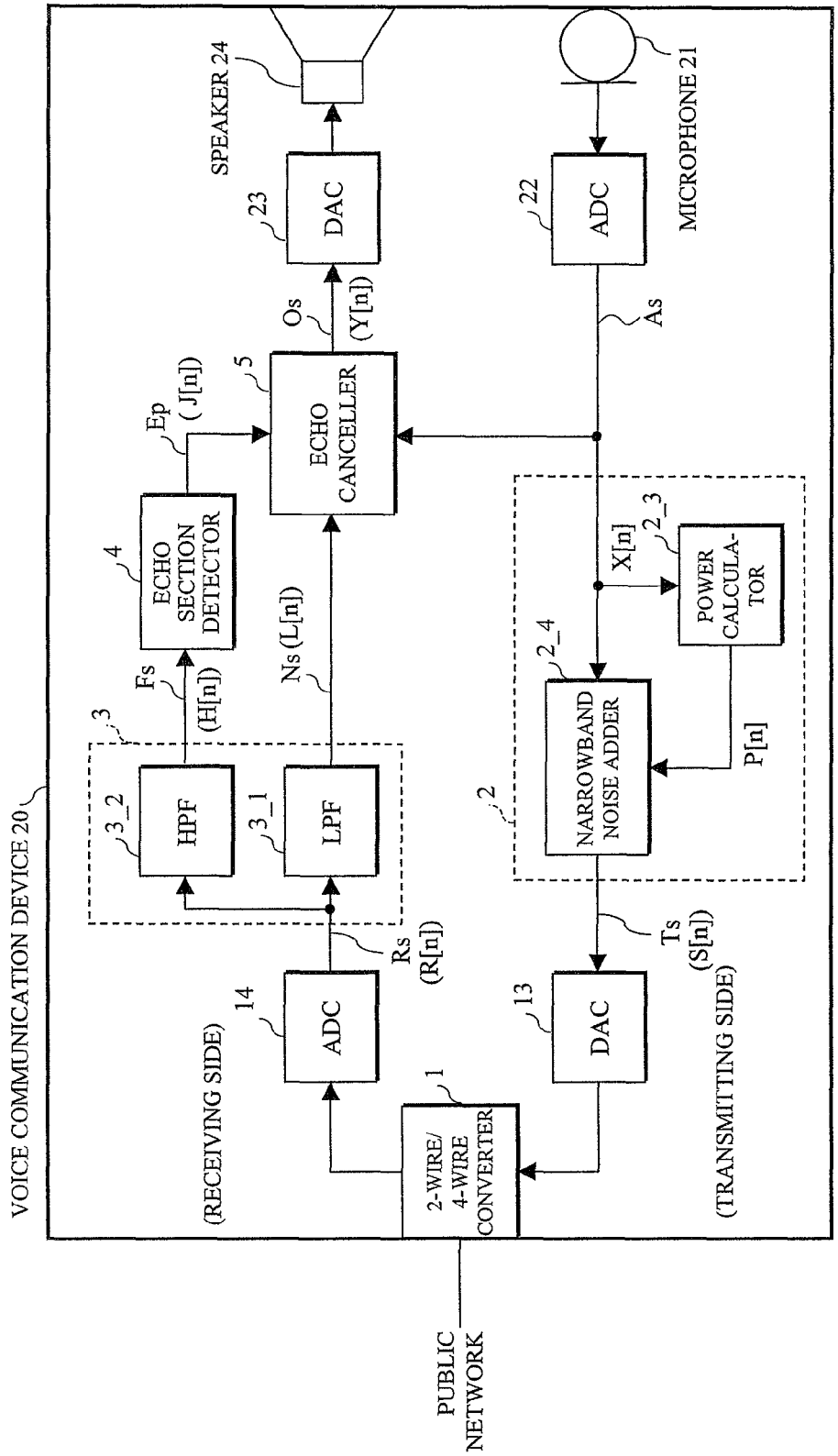
FIG. 4 is a block diagram showing an arrangement of an embodiment [2] of an echo processing method and device according to the present invention.

FIGS. 4 and 5

In this embodiment, the echo processing method and device according to the present invention are applied to a voice communication device. Consequently, the voice communication device 20 is only connected to the public network through the 2-wire/4-wire converter 1. The near end signal (reference signal) As is obtained by passing a voice signal from a microphone 21 through an analog/digital converter (ADC) 22. The output signal Os of the echo canceller 5 is outputted from a speaker 24 as a voice signal through a digital/analog converter (DAC) 23.

Also, the signal converter 2 is composed of a power calculator 2_3 and a narrowband noise adder 2_4.

Hereinafter, the operation of the embodiment [2] will be described divided into the transmitting side and the receiving side, focusing the operation different from that of the above-mentioned embodiment [1].

Operation on the Transmitting Side:

(1) The voice signal of the microphone 21 becomes the near end signal As digitalized, which has a digital value X[n] ("n" indicates time).
(2) The power calculator 2_3 makes X[n] an input, and calculates the power P[n] (=X[n]*X[n]) to be outputted.

(3) The narrowband noise adder 2_4 makes X[n] and P[n] inputs to output the transmitting signal Ts of a digital value S[n], which is given by the following equation:

$$S[n] = X[n] + N[n] \quad \text{Eq. (1)}$$

$$\text{where } N[n] = N_0[n] \times \sqrt{\frac{\sum X[n]^2}{\sum X_0[n]^2}}$$

In the above-mentioned Eq. (1), $N_0[n]$ indicates a narrowband noise (band limited white noise) of 4-8 kHz. Accordingly, the transmitting signal Ts becomes a signal in which the narrowband noise of 4-8 kHz is added to the near end signal As. It is to be noted that FIG. 5 shows a calculation example of N[n] (where the frame length=10 samples).
(4) The DAC 13 converts the transmitting signal S[n] into the analog signal to be transmitted.
Operation on the Receiving Side:
(1) The receiving signal from the 2-wire/4-wire converter 1 becomes the receiving signal Rs of a value R[n] digitalized at the ADC 14.
(2) The HPF 2_2 and the LPF 2_1 separate the digital value R[n] into the specified frequency band Fs of a highpass signal H[n] and the non-specified frequency band Ns of a lowpass signal L[n].
(3) The echo section detector 4 observes the power of the H[n], thereby detecting the echo section Ep as shown by the following equations:
When $10 \log_{10} (H[n]^2) >$ threshold Th:

$$J[n] \text{ of echo section signal } Ep=1 \quad \text{Eq. (2)}$$

When $10 \log_{10}(H[n]^2) <$ threshold Th:

$$J[n] \text{ of echo section signal } Ep=0 \quad \text{Eq. (3)}$$

(4) The echo canceller 5 suppresses the echo component included in the lowpass signal from the lowpass signal L[n] and the reference signal X[n] to output the output signal Os of a digital value Y[n]. For the estimation of an echo pass and the control of the echo suppression, a detection result J[n] of the echo section Ep is used.
(5) The DAC 23 converts the output signal Y[n] into an analog signal to be reproduced from the speaker 24.

Embodiment [3]

Figure 6:
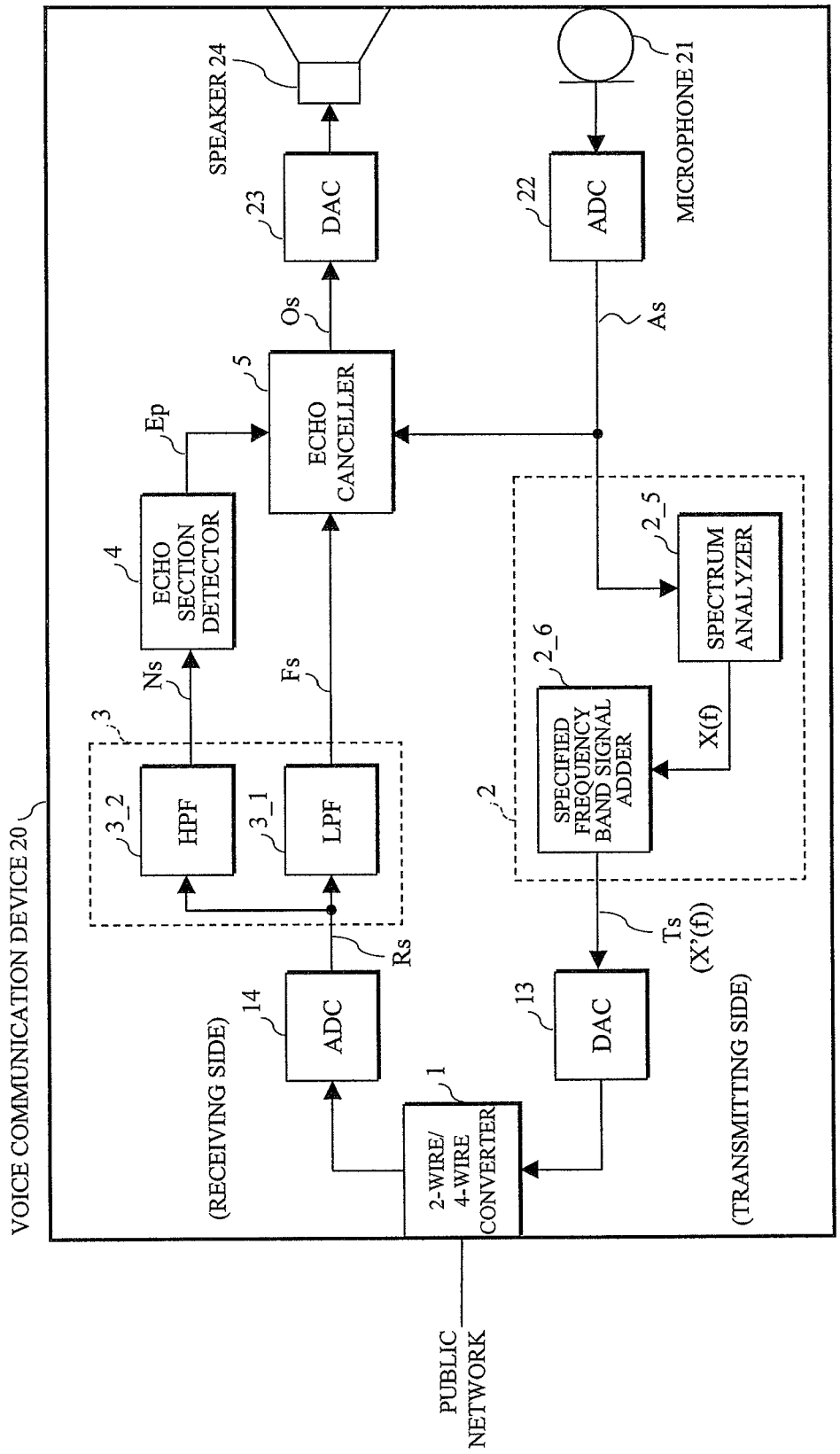
FIG. 6 is a block diagram showing an arrangement of an embodiment [3] of an echo processing method and device according to the present invention.
Figure 7:
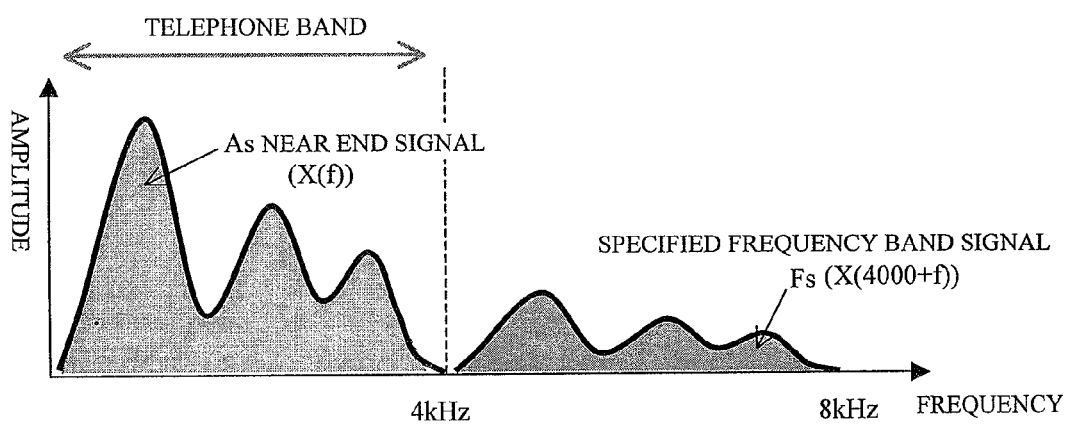
FIG. 7 is a frequency characteristic diagram showing an operation principle of the embodiment [3] shown in FIG. 6.

FIGS. 6 and 7

Also in this embodiment, the echo processing method and device according to the present invention are applied to the voice communication device 20 in the same way as the above-mentioned embodiment [2]. However, this embodiment [3] is different from the above-mentioned embodiment [2] in that the signal converter 2 is composed of a spectrum analyzer 2_5 and a specified frequency band signal adder 2_6. Hereinafter, only the operation of the signal converter 2 will be described.
(1) The spectrum analyzer 2_5 performs a frequency analysis to obtain a spectrum X(f) (f=0-4 kHz) of the near end signal As.
(2) The specified frequency band signal adder 2_6 generates a spectrum (see FIG. 7) shifted to the specified frequency band of 4-8 kHz from the spectrum of 0-4 kHz based on the following equation:

$$X(4000+f)=X(f)*0.1 \text{(constant)} \quad \text{Eq. (4)}$$

(3) The specified frequency band signal adder 2_6 further obtains a spectrum X'(f) by adding the spectrum X (4000+f) to the spectrum X(f), and converts the spectrum X'(f) into a time domain to be outputted as the transmitting signal Ts.

Embodiment [4]

Figure 8:
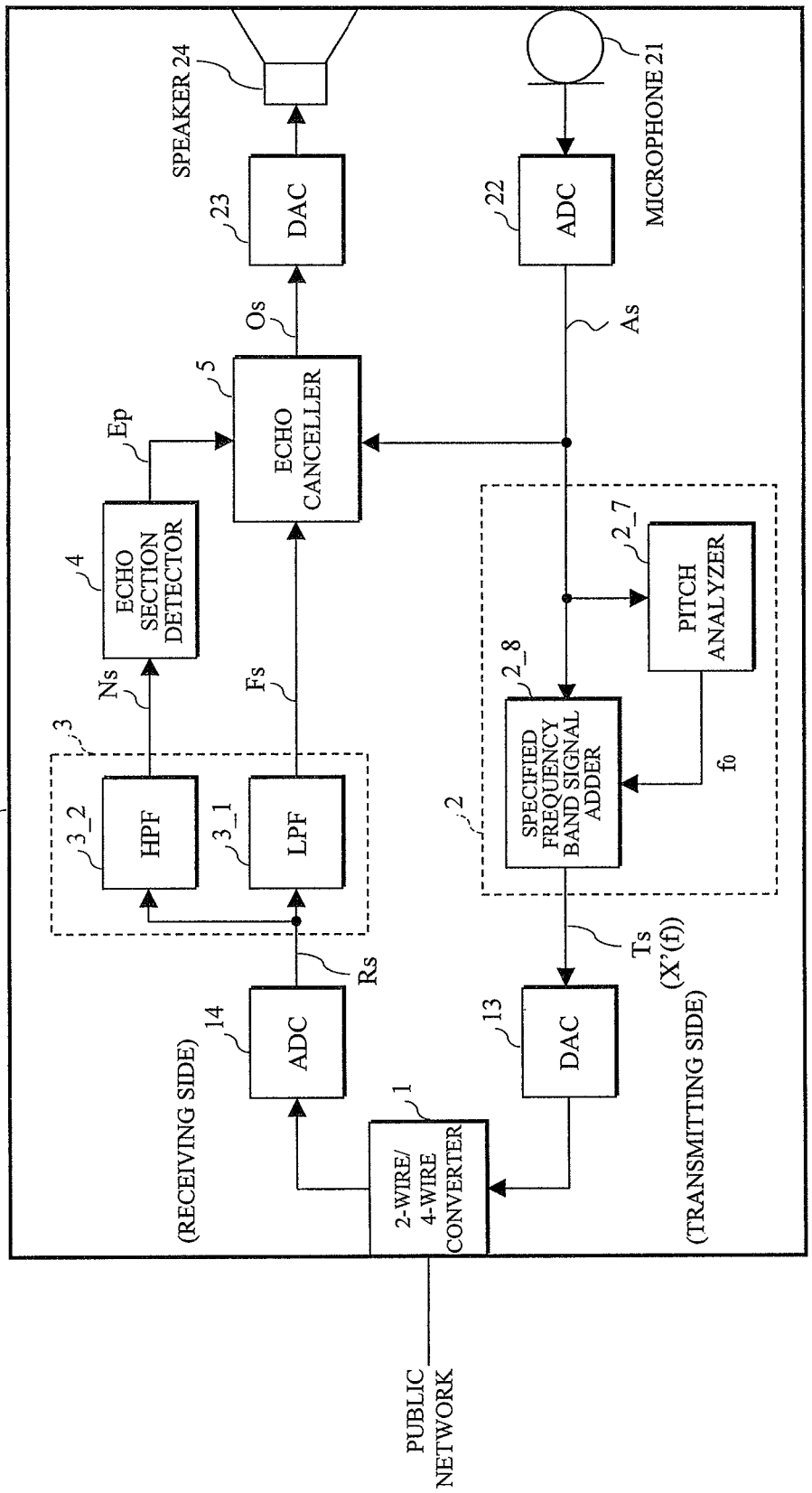
FIG. 8 is a block diagram showing an arrangement of an embodiment [4] of an echo processing method and device according to the present invention.
Figure 9:
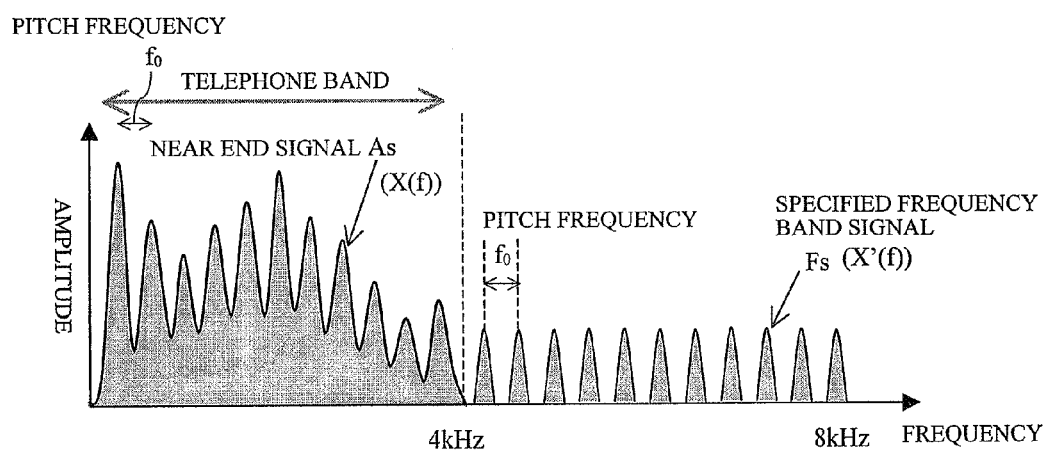
FIG. 9 is a frequency characteristic diagram showing an operation principle of the embodiment [4] shown in FIG. 8.
Figure 10:
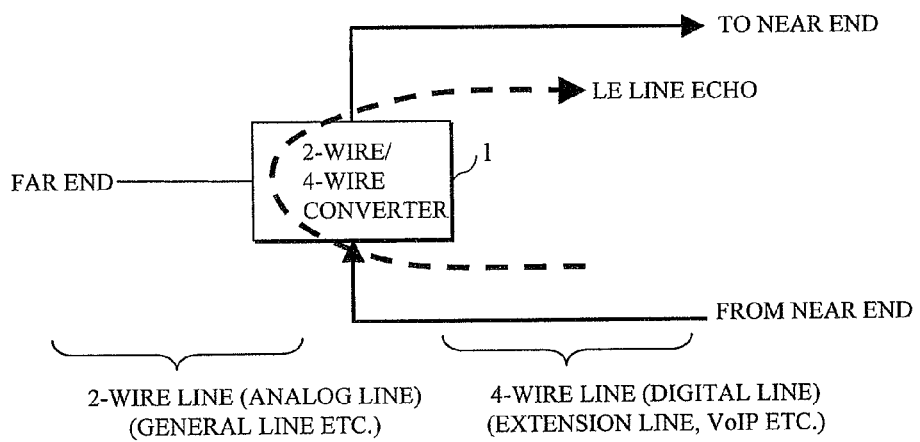
FIG. 10 is a block diagram illustrating a general line echo.

FIGS. 8 and 9

Also in this embodiment, the echo processing method and device according to the present invention are applied to the voice communication device 20 in the same way as the above-mentioned embodiments [2] and [3]. However, this embodiment [4] is different from the above-mentioned embodiments [2] and [3] in that the signal converter 2 is composed of a pitch analyzer 2_7 and a specified frequency band signal adder 2_8. Only the operation of the signal converter 2 will now be described.
(1) The pitch analyzer 2_7 performs a pitch analysis to obtain a pitch frequency $f_0$ of the near end signal As (see FIG. 9).
(2) The specified frequency band signal adder 2_8 generates a spectrum (see FIG. 9) of the specified frequency band of 4-8 kHz based on the following equations:
When "f" is an integral multiple of $f_0$, $$X(f)=A \quad \text{Eq. (5)}$$

where A is a preset amplitude (constant)
In other cases, $$X(f)=0 \quad \text{Eq. (6)}$$

(3) The specified frequency band signal adder 2_8 further obtains the spectrum X(f) of the near end signal As, obtains a spectrum X"(f) in which the above-mentioned spectrum X'(f) is added to the spectrum X(f), and converts the spectrum X" (f) into the transmitting signal Ts in a time domain to be outputted.

It is to be noted that the present invention is not limited by the above-mentioned embodiments, and it is obvious that various modifications may be made by one skilled in the art based on the recitation of the claims.

What is claimed is:
1. An echo processing method comprising:
a first step of generating a signal of a specified frequency band in conformity with a near end signal, and adding the signal of the specified frequency band to the near end signal to form a transmitting signal;
a second step of separating receiving signals into the signal of the specified frequency band and a signal of a band other than the specified frequency band;
a third step of detecting an echo section based on the signal of the specified frequency band separated at the second step; and
a fourth step of removing an echo component in the signal of the band other than the specified frequency band and of detecting a level of the echo component, based on the near end signal in the echo section.
2. The echo processing method as claimed in claim 1, wherein each step is executed with a digital signal, the transmitting signal is converted into an analog signal to be inputted to a 2-wire/4-wire converter, and the receiving signal is outputted from the 2-wire/4-wire converter to be converted into the digital signal.
3. The echo processing method as claimed in claim 1, wherein the first step includes a step of determining whether or not voice is included in the near end signal, and a step of generating, when it is determined that the voice is included in the near end signal, the signal of the specified frequency band and of adding the generated signal to the near end signal to form the transmitting signal.

4. The echo processing method as claimed in claim 3, wherein the signal of the specified frequency band comprises a sine wave.

5. The echo processing method as claimed in claim 1, wherein the first step includes a step of calculating power of the near end signal, and a step of generating the signal of the specified frequency band based on the power of the near end signal and of adding the generated signal to the near end signal to form the transmitting signal.

6. The echo processing method as claimed in claim 5, wherein the signal of the specified frequency band comprises a narrowband noise.

7. The echo processing method as claimed in claim 1, wherein the first step includes a step of acquiring a spectrum of the near end signal, a step of converting the spectrum into a spectrum of the specified frequency band, and a step of adding the spectrum of the near end signal with the spectrum of the specified frequency band to be converted into the transmitting signal in time domain.

8. The echo processing method as claimed in claim 1, wherein the first step includes a step of acquiring a pitch frequency of the near end signal, a step of generating in the specified frequency band a spectrum having a pitch in a vicinity of frequencies of an integral multiple of the pitch frequency, and a step of acquiring a spectrum of the near end signal, of adding the spectrum of the near end signal to the spectrum generated in the specified frequency band to be converted into the transmitting signal in time domain.

9. The echo processing method as claimed in claim 1, wherein the specified frequency band comprises a high frequency band equal to or more than a predetermined frequency.

10. The echo processing method as claimed in claim 1, wherein the third step includes a step of comparing one of an amplitude and power of the signal of the specified frequency band with a predetermined threshold, of determining the echo section when one of the amplitude and power is more than the threshold, and of determining a non-echo section when one of the amplitude and power is less than the threshold value.

11. An echo processing device comprising:
a first portion generating a signal of a specified frequency band in conformity with a near end signal, and adding the signal of the specified frequency band to the near end signal to form a transmitting signal;
a second portion separating receiving signals into the signal of the specified frequency band and a signal of a band other than the specified frequency band;
a third portion detecting an echo section based on the signal of the specified frequency band separated by the second portion; and
a fourth portion removing an echo component in the signal of the band other than the specified frequency band and detecting a level of the echo component, based on the near end signal in the echo section.

12. The echo processing device as claimed in claim 11, wherein each portion is executed with a digital signal, the transmitting signal is converted into an analog signal to be inputted to a 2-wire/4-wire converter, and the receiving signal is outputted from the 2-wire/4-wire converter to be converted into the digital signal.

13. The echo processing device as claimed in claim 11, wherein the first portion includes a portion determining whether or not voice is included in the near end signal, and a portion generating, when it is determined that the voice is included in the near end signal, the signal of the specified frequency band and adding the generated signal to the near end signal to form the transmitting signal.

14. The echo processing device as claimed in claim 13, wherein the signal of the specified frequency band comprises a sine wave.

15. The echo processing device as claimed in claim 11, wherein the first portion includes a portion calculating power of the near end signal, and a portion generating the signal of the specified frequency band based on the power of the near end signal and adding the generated signal to the near end signal to form the transmitting signal.

16. The echo processing device as claimed in claim 15, wherein the signal of the specified frequency band comprises a narrowband noise.

17. The echo processing device as claimed in claim 11, wherein the first portion includes a portion acquiring a spectrum of the near end signal, a portion converting the spectrum into a spectrum of the specified frequency band, and a portion adding the spectrum of the near end signal with the spectrum of the specified frequency band to be converted into the transmitting signal in time domain.

18. The echo processing device as claimed in claim 11, wherein the first portion includes a portion acquiring a pitch frequency of the near end signal, a portion generating in the specified frequency band a spectrum having a pitch in a vicinity of frequencies of an integral multiple of the pitch frequency, and a portion acquiring a spectrum of the near end signal, adding the spectrum of the near end signal to the spectrum generated in the specified frequency band to be converted into the transmitting signal in time domain.

19. The echo processing device as claimed in claim 11, wherein the specified frequency band comprises a high frequency band equal to or more than a predetermined frequency.

20. The echo processing device as claimed in claim 11, wherein the third portion includes a portion comparing one of an amplitude and power of the signal of the specified frequency band with a predetermined threshold, determining the echo section when one of the amplitude and power is more than the threshold, and determining a non-echo section when one of the amplitude and power is less than the threshold value.

* * * * *